United States Patent [19]
Takagi et al.

[11] Patent Number: 4,841,431
[45] Date of Patent: Jun. 20, 1989

[54] PROGRAMMABLE TRANSFER MACHINE

[75] Inventors: Masayoshi Takagi, Kariya; Yoshio Yoshioka, Anjo; Tetsuo Matsuzaki, Nishio; Shuhei Noro, Aichi; Syouji Ikawa, Okazaki; Katutoshi Naruse, Toyota, all of Japan

[73] Assignees: Toyoda Koki Kabushiki Kaisha, Kariya; Toyota Jidosha Kabushiki Kaisha, Toyota, both of Japan

[21] Appl. No.: 72,142

[22] Filed: Jul. 10, 1987

[30] Foreign Application Priority Data

Jul. 10, 1986 [JP] Japan .................. 61-162659

[51] Int. Cl.⁴ ............................................. G06F 15/46
[52] U.S. Cl. .................. 364/187; 364/474.11
[58] Field of Search .................. 364/167–171, 364/474, 475, 184, 187, 513, 474.11; 371/8, 9

[56] References Cited

U.S. PATENT DOCUMENTS

| | | | |
|---|---|---|---|
| 3,576,540 | 4/1971 | Fair et al. | 364/474 |
| 3,623,014 | 11/1971 | Doelz et al. | 371/9 |
| 4,237,598 | 12/1980 | Williamson | 364/474 |
| 4,288,849 | 9/1981 | Yoshida et al. | 364/474 |
| 4,309,600 | 1/1982 | Perry et al. | 364/474 |
| 4,472,783 | 9/1984 | Johnstone et al. | 364/474 |
| 4,473,883 | 9/1984 | Yoshida et al. | 364/474 |
| 4,564,913 | 1/1986 | Yomogida et al. | 364/474 |
| 4,698,629 | 10/1987 | Mori et al. | 364/474 |
| 4,698,766 | 10/1987 | Entwistle et al. | 364/474 |

FOREIGN PATENT DOCUMENTS 60-67056 4/1985 Japan .

*Primary Examiner*—Allen MacDonald
*Attorney, Agent, or Firm*—Oblon, Spivak, McClelland, Maier & Neustadt

[57] ABSTRACT

A transfer machine comprising a conveyor for conveying workpieces to stations and numerically controlled machine tools disposed at their respective stations. These machine tools are controlled by sequence controllers, which are connected with their respective numerical controllers. All the programs for machining operations are stored in each numerical controller. When some station is in trouble, the normal machine tool disposed at a station adjacent to the station in trouble is caused to execute the program originally assigned to the station in trouble, as well as the program assigned to the normal station itself.

5 Claims, 5 Drawing Sheets

FIG. 3

| | ST1 | ST2 | ST3 | PROGRAMS EXECUTED AT STATION ST1 | PROGRAMS EXECUTED AT STATION ST2 | PROGRAMS EXECUTED AT STATION ST3 |
|---|---|---|---|---|---|---|
| 1 | ○ | ○ | ○ | PG1 | PG2 | PG3 |
| 2 | × | ○ | ○ | — | PG1, PG2 | PG3 |
| 3 | ○ | × | ○ | PG1, PG2 | — | PG3 |
| 4 | ○ | ○ | × | PG1 | PG2, PG3 | — |
| 5 | × | × | ○ | — | — | PG1, PG2, PG3 |
| 6 | ○ | × | × | PG1, PG2, PG3 | — | — |
| 7 | × | ○ | × | — | PG1, PG2, PG3 | — |
| 8 | × | × | × | — | — | — |

K1, K2, K3 : END SIGNALS OF PG1, PG2, PG3
A1, A2, A3 : ST1, ST2, ST3 TROUBLE SIGNALS
S : OPERATION START SIGNAL

K1, K2, K3 : END SIGNALS OF PG1, PG2, PG3
A1, A2, A3 : ST1, ST2, ST3 TROUBLE SIGNALS
S : OPERATION START SIGNALS

PROGRAMMABLE TRANSFER MACHINE

FIELD OF THE INVENTION

The present invention relates to a transfer machine in which several machining stations are arranged in line and which, when a trouble takes place at one of the stations, permits the remaining machining operations to be performed at another station.

BACKGROUND OF THE INVENTION

A transfer machine uses a different machine tool at each individual station. Workpieces are caused to pass through these stations to undergo a series of machining processes. In recent years, a flexible transfer machine has been put into practical use to perform machining operations flexibly. Specifically, this machine makes use of numerically controlled machine tools disposed at various stations. Usually, each individual numerically controlled machine tool is loaded with a program to be executed at the corresponding station and, therefore, each machine tool simply executes that program.

If a trouble occurs at some station, then the machining process assigned to the station is not performed. Therefore, the machining process cannot be continued until the whole transfer machine is stopped and the station in trouble is repaired. Especially, in a system using a number of numerically controlled machine tools, troubles often take place. Each time a trouble occurs at some station, the whole system must be stopped. Hence, the machining efficiency is low.

SUMMARY OF THE INVENTION

Accordingly, it is a main object of the invention to provide a transfer machine which can continue its normal machining operation even if a breakdown occurs at some station, whereby a decrease in the machining efficiency is prevented.

In summary, a programmable transfer machine according to the invention comprises a conveyor for conveying workpieces to various stations successively and numerically controlled machine tools disposed at the stations. Computer programs are loaded into the machine tools so that they may carry out machining operations assigned to the stations. Further, the transfer machine is provided with program execution control apparatuses which receive a signal indicating that the numerically controlled machine tool disposed at some station have broken down. When such a signal is applied to one program execution control apparatus, this apparatus instructs the machine tool at a normal station adjacent to the station in trouble to execute the program originally assigned to the station in trouble, as well as the program assigned to the normal station itself.

In this system, when a trouble occurs at some station, an associated program execution control apparatus is informed of this fact. Then, the control apparatus assigns the program originally assigned to the station in trouble to a certain neighboring normal station. The machine tool at this normal station executes the program originally assigned to the station in trouble, in addition to the program assigned to the normal station itself. Immediately after a trouble takes place, the processing at the station in trouble is stopped. The program assigned to this station in trouble is executed at another normal station. Consequently, the whole transfer machine can continue its machining processes without deteriorating the efficiency.

BRIEF DESCRIPTION OF THE DRAWINGS

FIG. 3 is a diagram for illustrating the manner in which programs are assigned to stations when troubles take place;

DETAILED DESCRIPTION OF THE PREFERRED EMBODIMENT

Figure 1:
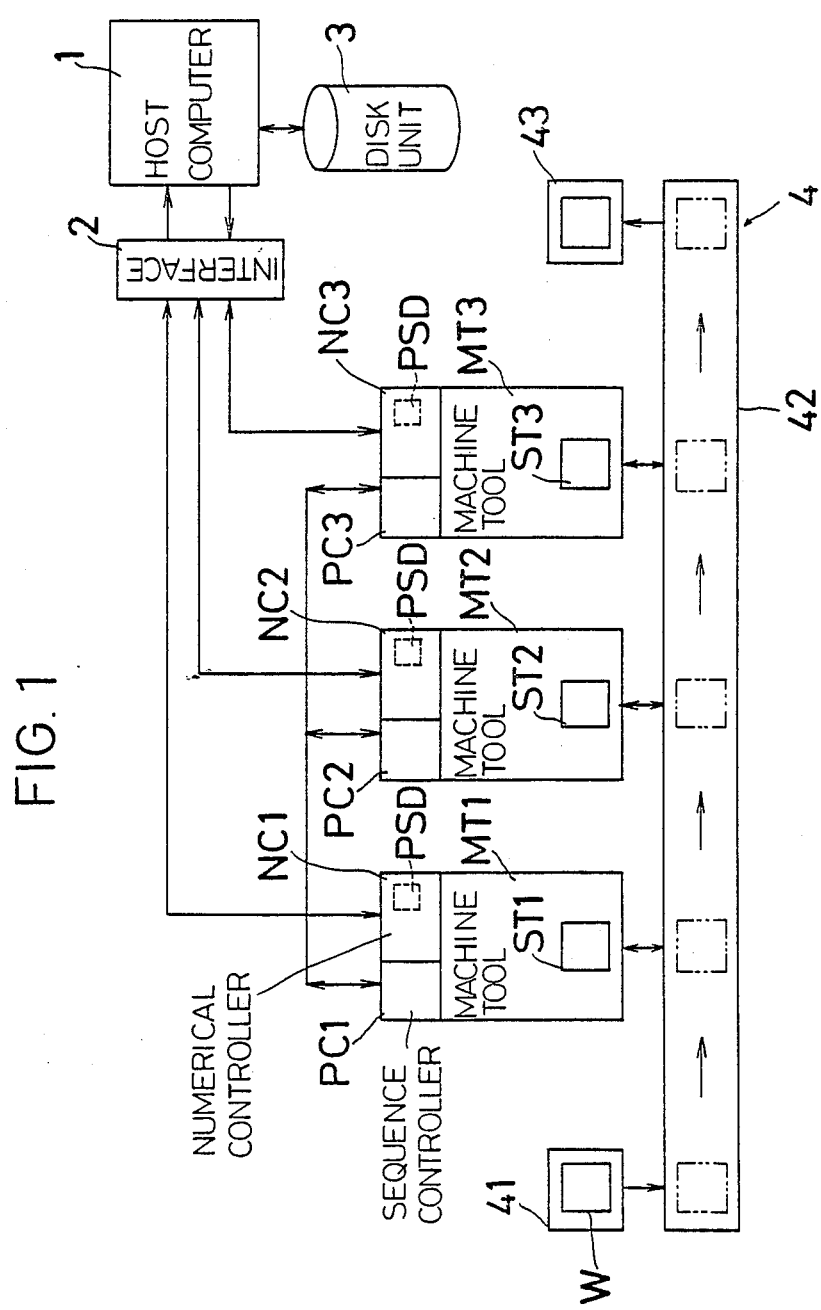
FIG. 1 is a block diagram of a transfer machine according to the invention.

Referring to FIG. 1, there is shown a transfer machine according to the invention. This machine has a host computer 1 which controls all the components of the machine. A computer program for the computer 1 is stored in a magnetic disk unit 3. A conveyor 4 includes a transfer line 42. Workpieces W are placed onto the transfer line 42 from a loading station 41. Then, the workpieces W are successively conveyed to stations ST1, ST2, and ST3. After undergoing machining operations at all the stations, the workpieces W are moved into an unloading station 43. This series of operations for conveyance is controlled by a sequence controller (not shown) that receives from the host computer 1 a signal indicating the start of a movement from one station to the next. Machine tools MT1, MT2, MT3 are disposed at the stations ST1, ST2, ST3, respectively. The machine tools MT1, MT2, MT3 are controlled by sequence controllers PC1, PC2, PC3, respectively, which are connected with numerical controllers NC1, NC2, NC3, respectively. A signal indicating a trouble at some station is applied to other sequence controllers and also to the host computer 1.

Figure 4A:
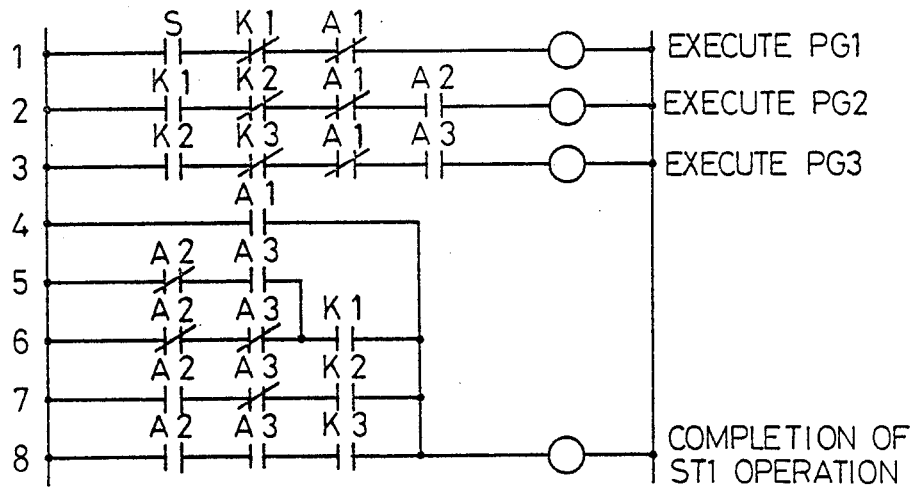
FIGS. 4(a), 4(b), and 4(c) are diagrams of ladder circuits of sequence controllers at stations, the controllers embodying program execution control apparatuses.
Figure 4B:
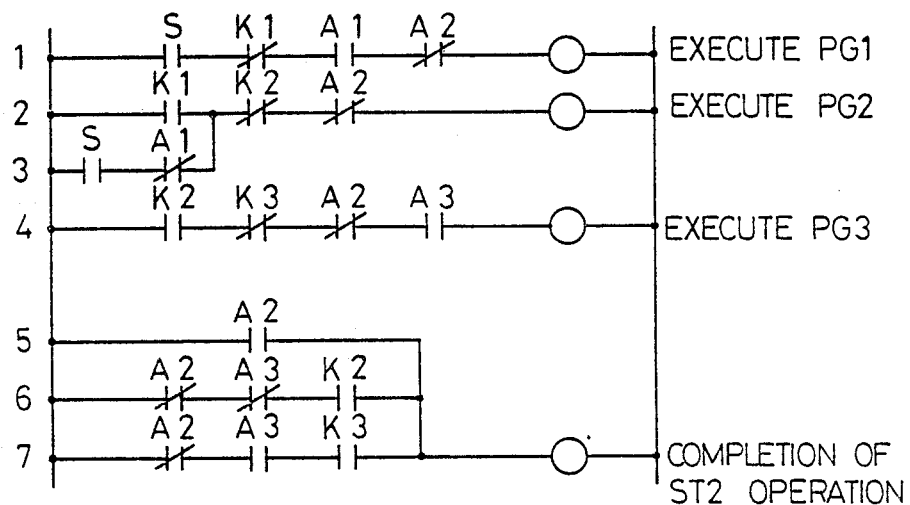
Figure 4:
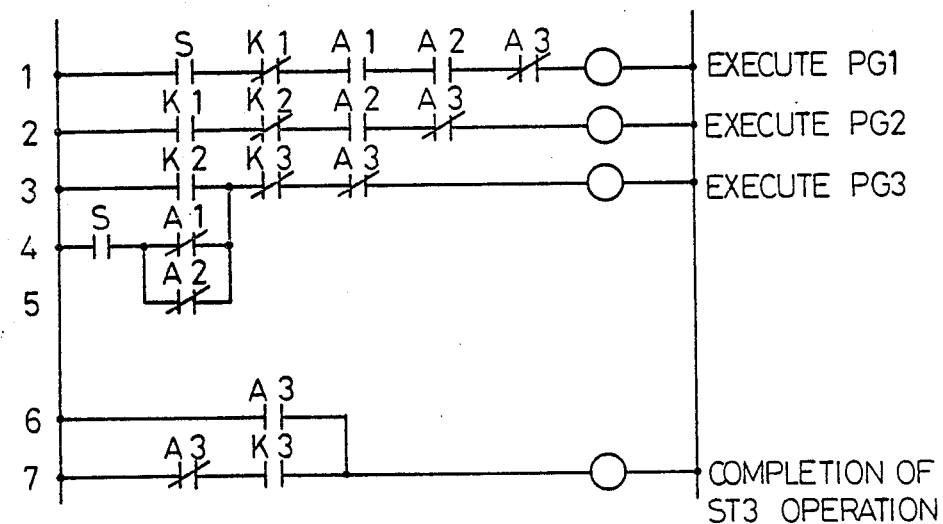

Each sequence controller receives a trouble signal produced from the sequence controller (PCx) of one machine tool (MTx) in trouble, and is capable of deciding which program should be executed. Each controller has a ladder circuit constructed as shown in FIG. 4(a), 4(b), or 4(c). FIG. 3 shows that which programs are executed at which stations when troubles occur. Each numerical controller incorporates a program storage device PSD which receives all programs PG1, PG2, PG3 executed at the stations from the host computer 1 and stores them. Each numerical controller causes the corresponding machine tool to execute the program or programs instructed by the corresponding sequence controller in an instructed order.

Figure 2:
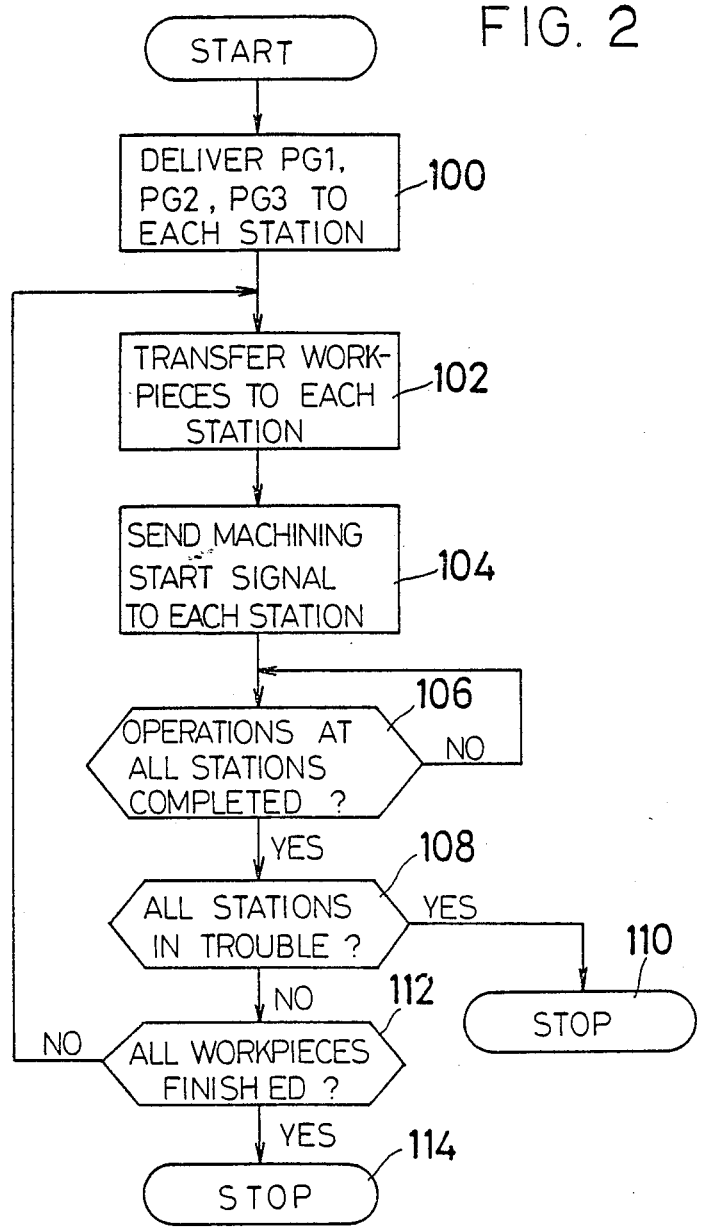
FIG. 2 is a flowchart for illustrating a sequence of operations performed by the host computer of the transfer machine shown in FIG. 1.

The system constructed as described above operates in the manner described below. As illustrated in FIG. 2, at the beginning of a process, the host computer 1 sends all programs for machining operations to all the stations (step 100). Then, workpieces W are conveyed from the present stations to the neighboring ones and placed there (step 102). Thereafter, the host computer 1 supplies a signal indicating the start of machining operations to the stations to initiate the operations (step 104). Then, a decision is made to determine whether the operations are completed (step 106). If so, a decision is made to ascertain whether all the stations are in trouble (step 108). If all the stations break down, no further machining process is allowed and so the process is stopped (step 110). If all the stations are not in trouble, then the operations to be carried out at stations in trouble can be performed at other stations. In this case, a decision is made to see if all the workpieces have been fully machined (step 112). If so, the workpieces are conveyed to the next stations (step 102). In this way, the machining process is continued until all the workpieces are machined fully. When an instruction for the start of a machining operation is given to the sequence controllers at the stations, each controller operates in the manner described below.

(a) Operation of Sequence Controller PC1

When the station ST2 or both stations ST2 and ST3 are in trouble, the sequence controller PC1 causes the station ST1 to perform instead of the station or stations in trouble, as illustrated in FIG. 3.

Referring to FIGS. 4(a)–4(c), A1–A3 indicate the contacts of relays which are actuated when the stations ST1–ST3 are respectively in trouble. Contacts K1–K3 of relays indicate which of the programs PG1–PG3 has or have been executed in machining the workpieces conveyed at the stations.

Referring particularly to FIG. 4(a), where all the stations are normal, when a signal S indicating the start of a machining operation is applied to the sequence controller PC1, this controller delivers a signal indicating the start of execution of program PG1 to the numerical controller NC1 (row 1). The controller receives a signal indicating the end of the execution of the program, and delivers a signal indicating that the operation at the station ST1 has been completed (row 6).

Where only the station ST2 is in trouble, when a signal indicating the start of an operation is applied to the controller, this controller produces a signal indicating the start of program PG1 (row 1). After the execution of the program is completed, the controller delivers a signal indicating the start of execution of program PG2 (row 2). After the end of the execution of program PG2, the controller delivers a signal indicating that the machining operation performed at the station ST1 is completed (row 7).

Where the stations ST2 and ST3 are in trouble, when a signal indicating the start of a machining operation is applied to the controller, this controller delivers a signal indicating the start of execution of program PG1, a signal indicating the start of execution of program PG2, and a signal indicating the start of execution of program PG3 one after another (rows 1, 2, 3). After the end of the execution of program PG3, the controller delivers a signal indicating that the operation performed at the station ST1 has been completed (row 8).

Where only the station ST3 is in trouble, the controller does not delivers a signal indicating the start of execution of program PG2 and, therefore, the controller does not deliver a signal indicating the start of execution of program PG3 (rows 2 and 3). After the completion of execution of program PG1, the controller delivers a signal indicating that the operation performed at the station ST1 has been completed (row 5). Where the station ST1 itself is in trouble, the controller does not deliver any signal indicating execution of a program but immediately delivers a signal indicating the completion of operation performed at the station ST1.

(b) Operation of Sequence Controller PC2

The station ST2 acts as an alternative station when the station ST1 or ST3 or both of them are in trouble, as illustrated in FIG. 3.

Referring to FIG. 4(b), where all the stations are normal, when a signal indicating the start of execution of a machining operation is applied to the controller PC2, this controller delivers a signal indicating the start of execution of program PG2 to the numerical controller NC2 (row 3). The controller receives a signal indicating the end of execution of the program, and delivers a signal indicating the completion of the operation performed at the station ST2 (row 6).

Where only the station ST1 is in trouble, when a signal indicating the start of a machining operation is applied to the controller PC2, it delivers a signal indicating the start of execution of program PG1 (row 1). After the completion of the execution of the program PG1, the controller delivers a signal indicating the start of program PG2 (row 2). When the execution of the program PG2 ends, the controller delivers a signal indicating that the execution of the operation performed at the station ST2 is complete (row 6).

Where only the station ST3 is in trouble, when a signal indicating the start of a machining operation is applied to the controller PC2, it delivers a signal indicating the start of execution of program PG2 (row 3). After the completion of the execution of this program PG2, the controller delivers a signal indicating the start of execution of program PG3 (row 4). When the execution of the program PG3 ends, the controller delivers a signal indicating that the operation performed at the station ST2 is complete (row 7).

Where the stations ST1 and ST3 are in trouble, when a signal indicating the start of a machining operation is applied to the controller, it delivers a signal indicating the start of execution of program PG1 (row 1). Then, it delivers a signal indicating the start of execution of program PG2 (row 2). Subsequently, it delivers a signal indicating the start of execution of program PG3 (row 4). After the completion of the execution of program PG3, it delivers a signal indicating that the execution of the operation performed at the station ST2 is complete (row 7).

When the station ST2 itself is in trouble, the controller does not produce any signal indicating the start of a program but immediately delivers a signal indicating the completion of the operation performed at the station ST2.

(c) Operation of Sequence Controller PC3

The station ST3 serves as an alternative station when the stations ST1 and ST2 are in trouble, as illustrated in FIG. 3.

Referring to FIG. 4(c), where both the station ST3 itself and another station are normal, when a signal indicating the start of a machining operation is applied to the controller PC3, this controller delivers a signal indicating the start of execution of program PG3 to the numerical controller NC3 (row 4). The controller then receives a signal indicating that the execution of the program has been completed, and delivers a signal indicating that the operation performed at the station ST3 is completed (row 7).

Where the stations ST1 and ST2 are in trouble, when a signal indicating the start of a machining operation is applied to the controller, it delivers a signal indicating the start of execution of program PG1 (row 1). Then, the controller delivers a signal indicating the start of execution of program PG2 (row 2). Subsequently, the controller delivers a signal indicating the start of execution of program PG3 (row 3). After the completion of the execution of program PG3, the controller delivers a signal indicating the completion of the operation performed at the station ST3 (row 7).

Where the station ST3 itself is in trouble, the controller does not deliver any signal indicating the start of a program but immediately produces a signal indicating the completion of the operation performed at the station ST3.

As described above, when a station is in trouble, another normal station can perform the operation assigned to the station in trouble. Therefore, if troubles occur in the transfer machine, the machining operation assigned to the stations in trouble can be automatically shifted to other stations, as long as one or more numerically controlled machine tools work normally. Hence, the machining process can be continued.

When the system is machining workpieces, if the station ST2 breaks down, for example, then the station ST1 executes the program PG2 from the workpiece that is being machined. In this way, during a machining process, when the next station is found to be in trouble, the machining operation assigned to the next station is carried out from the workpiece that is now being machined. Thus, the system works efficiently.

In the above example, all the programs are stored in each numerical controller. Alternatively, each numerical controller may store only the directly associated program. In this case, when one station is used as an alternative station, this station requires the host computer to send the program assigned to the station in trouble to the alternative station.

Also in the above example, each numerical controller at a station is equipped with a program execution control apparatus. The program execution control apparatuses may be incorporated in the host computer 1. In this case, a signal indicating a trouble is supplied from a station to the host computer 1, which then ascertains the station in trouble and determines an alternative station. Subsequently, the computer 1 sends the program originally assigned to the station in trouble to the numerical controller disposed at the alternative station.

What is claimed is:

1. A programmable transfer machine for processing plural workpieces, said workpieces moving through said transfer machine in only one direction, said machine comprising:
   a plurality of machining stations;
   a conveyor responsive to a transfer command signal applied thereto for simultaneously conveying workpieces to said machining stations successively only in said one direction so that each of said workpieces is transferred from one of said machining stations to another machining station each time said conveyor is operated;
   a plurality of numerically controlled machine tools respectively disposed at said machining stations, for respectively undertaking a series of machining operations which are to be performed on each of said workpieces, each of said machine tools being adapted to execute one or more machining programs assigned thereto, said machining operations undertaken by said machine tools;
   means included in each of said machine tools for generating a trouble signal when the machine tool is in trouble;
   program execution control means responsive to said trouble signal from each of said machine tools for causing a normal machine tool which is adjacent to said machine tool in trouble and at an upstream side of said conveyor, to execute one of said machining programs originally assigned to said machine tool in trouble in addition to another of said machining programs originally assigned to said normal machine tool;
   detection means for issuing a completion signal when the executions of all of said machining problems by one or more remaining normal machine tools are completed; and
   means for applying said transfer command signal to said conveyor so as to operate the same each time said completion signal is issued from said detection means.

2. A programmable transfer machine as set forth in claim 1, wherein said plurality of machine tools comprise at least three machine tools including a first machine tool which is most adjacent to an entrance of said conveyor;
   wherein when said first machine tool is in trouble, said program execution control means causes a successive one of said at least three machine tools to execute one of said machining programs which is originally assigned to said first machine tool, in addition to another of said machining programs which is originally assigned to said successive one machine tool;
   whereby any one of said machining programs which is originally assigned to any machine tool in trouble is executed by one of normal machine tools which is located at an upstream side of said conveyor.

3. A programmable transfer machine as set forth in claim 1, further comprising:
   means for causing all of said machine tools which are not in trouble to operate simultaneously each time the operation of said conveyor is completed.

4. A programmable transfer machine as set forth in claim 1, wherein said program execution control means comprises
   a plurality of separate control means respectively associated with said machine tools and capable of communicating with one another each for being informed of any machine tool in trouble, each of said separate control means having an assignment control program for instructing an associated one of said machine tools to execute, in addition to one of said machining programs which is originally assigned to said associated machine tool, another of said machining programs which is originally assigned to said any machine tool in trouble.

5. A programmable transfer machine as set forth in claim 4, wherein:
   each of said machine tool incorporates therein a program storage device for storing all of said machining programs assigned to said machine tools.

* * * * *